Dec. 28, 1965  J. W. BRAIN  3,226,638
APPARATUS FOR USE IN PHASE RELATIONSHIP DETERMINATIONS
INCLUDING A PLURALITY OF COILS MOUNTED ON
A FLAT STRUCTURAL MEMBER
Filed Feb. 26, 1962

INVENTOR.
James W. Brain
BY
Hovey, Schmidt, Johnson & Hovey.
ATTORNEYS.

Dec. 28, 1965  J. W. BRAIN  3,226,638
APPARATUS FOR USE IN PHASE RELATIONSHIP DETERMINATIONS
INCLUDING A PLURALITY OF COILS MOUNTED ON
A FLAT STRUCTURAL MEMBER
Filed Feb. 26, 1962  2 Sheets-Sheet 2
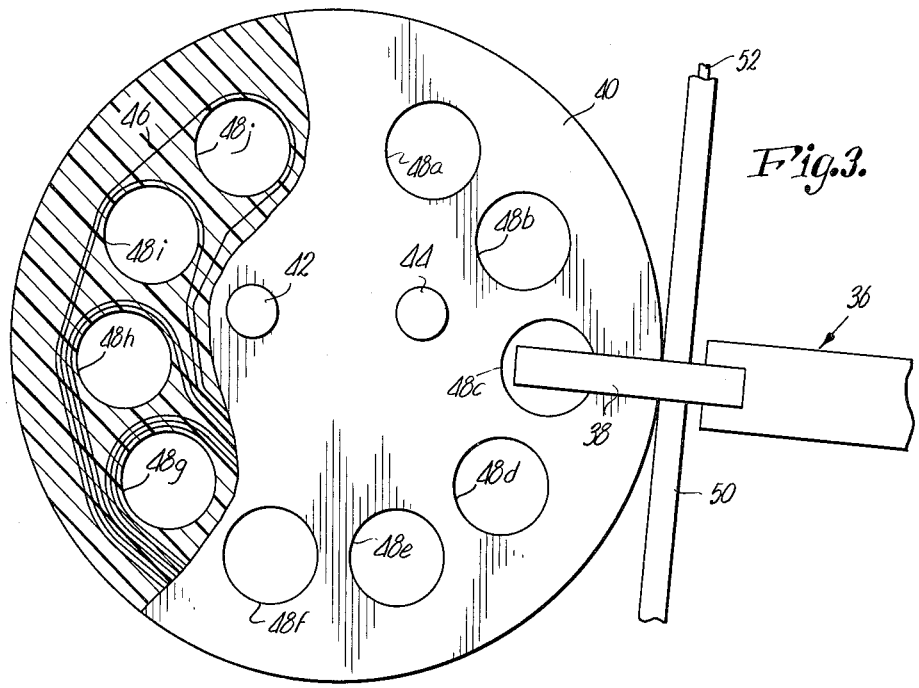
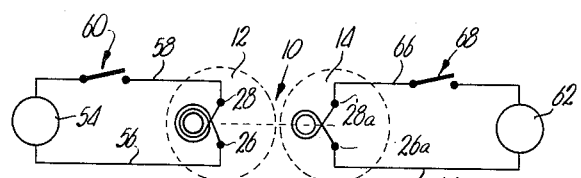
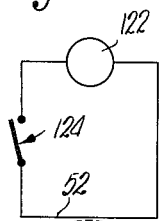
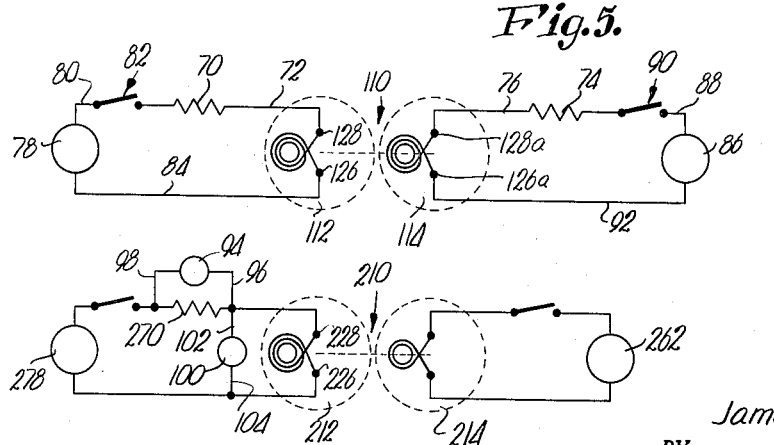
INVENTOR.
James W. Brain
BY Hovey, Schmidt, Johnson & Hovey.
ATTORNEYS.

United States Patent Office

3,226,638
Patented Dec. 28, 1965

3,226,638
APPARATUS FOR USE IN PHASE RELATIONSHIP DETERMINATIONS INCLUDING A PLURALITY OF COILS MOUNTED ON A FLAT STRUCTURAL MEMBER
James W. Brain, late of 501 Watson Road, Lee's Summit, Mo.; Virginia R. Brain, executrix of said James W. Brain, deceased
Filed Feb. 26, 1962, Ser. No. 175,598
8 Claims. (Cl. 324—83)

This invention relates to electrical measuring apparatus, and more particularly, to apparatus for transforming electrical power components into signals of an order permitting convenient computing of the phase angle between power components of a pair of electrical sources.

It is well known that it is possible to compute the phase angle between the power components of a pair of electrical sources by measuring the current flow produced by each component separately and the resultant current flow of the two components together. However, the order of the currents presented by the components is often not within the range of readily available current measuring devices, and it is frequently necessary to have available several different measuring devices for the computation of the phase angle between but a single pair of power components.

Accordingly, it is the primary object of this invention to provide, for use in conjunction with an induction-type measuring device in computing phase angles between power components of a pair of electrical sources, apparatus which will quickly and easily change the current readings of the device to a readily measurable value despite the actual value of the component to be measured.

Another important object of the invention is to provide, in a single apparatus, a number of available settings to present an appropriate meter reading for any actual component value throughout a wide range of values.

A further object of the invention is to provide apparatus which is simple to operate and is designed for convenient utilization with a "clamp on" type ammeter.

Another object of this invention is to provide apparatus for use in measuring the phase angle between a pair of currents, a pair of voltages, or a current and a voltage.

A yet further object of the instant invention is to provide an instrument of the kind mentioned, which is durable yet which may be economically fabricated from relatively inexpensively materials.

Other objects and advantages of the present invention will be obvious or become apparent from the specification and claims that follow.

In the drawings:

FIG. 3 is a plan view of a modified form of the apparatus, an electrical line and a clamp-on type ammeter appearing fragmentarily and in position to illustrate one manner of utilizing this form of the invention, parts of the member being broken away to reveal details of construction;

FIG. 4 is a schematic diagram of a typical installation for utilizing the apparatus of FIGS. 1 and 2 for determining the phase relationship between a pair of currents;

FIG. 5 is a schematic diagram of a typical installation for utilizing the apparatus of FIGS. 1 and 2 for determining the phase relationship between a pair of voltages;

FIG. 6 is a schematic diagram of a typical installation for utilizing the apparatus of FIGS. 1 and 2 for determining the phase relationship between a voltage and a current;

FIG. 7 is a schematic diagram of a typical installation for utilizing the apparatus of FIG. 3 for determining the phase relationship between a pair of currents.

Figure 2:
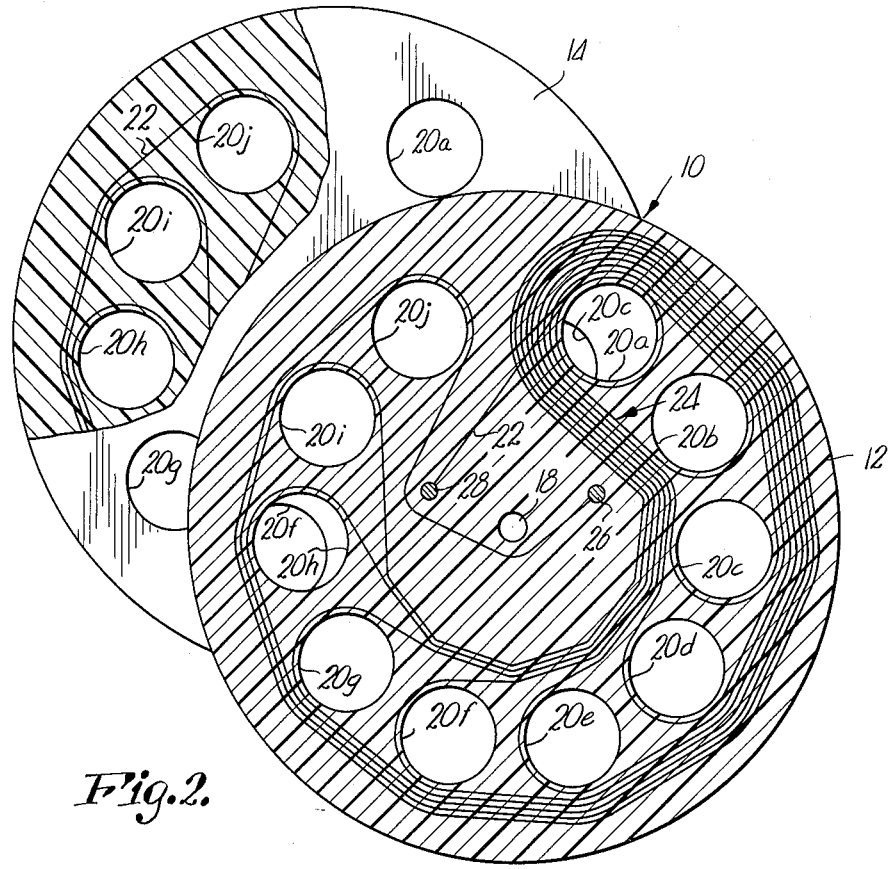
FIG. 2 is an exploded, perspective view of the apparatus of FIGURE 1, parts of the rotatable members being removed and shown in cross section to reveal details of construction.
Figure 1:
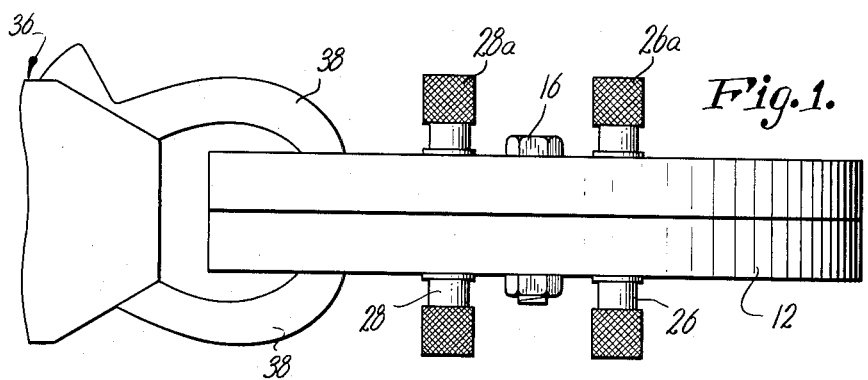
FIGURE 1 is an elevational view of a preferred form of the apparatus of this invention, a clamp-on type ammeter appearing fragmentarily in operating position to illustrate the manner of its use with the apparatus.

Referring initially to FIGS. 1 and 2 wherein is illustrated one preferred embodiment of the apparatus of this invention, the apparatus broadly numerated 10 comprises a pair of relatively flat disc members 12 and 14 disposed adjacent one another and being interconnected with an axle in the form of a bolt 16 passing through a centrally located aperture 18 in each member. Each of the members 12 and 14 has a plurality of spaced holes 20 extending therethrough and disposed peripherally around the respective members in the outer marginal portion thereof.

In the embodiment illustrated in FIG. 2, each member is provided with ten holes, the latter being designated 20a, 20b, 20c, 20d, 20e, 20f, 20g, 20h, 20i and 20j. A continuous conductor 22 is embedded in each of the members and is formed in a plurality of coils 24, each coil comprising a different number of turns of the conductor 22.

As best seen in connection with member 12, conductor 22 begins at a terminal post 26 and extends in one continuous coil around all of the holes 20a–20j in member 12. Conductor 22 then extends in continuation of the original coil around all of the holes 20a–20i and continues in another coil around all of the holes 20a–20h. As is evident in the drawings, the windings of conductor 22 proceed with each successive coil encircling one less hole of the member than the previous coil until the final coil of conductor 22 passes only around hole 20a and extends into electrical coupling with a second terminal post 28. Thus, what has been presented is a plurality of holes in member 12, each hole having a separate coil of conductor 22 therearound, the respective coils of conductor 22 each comprising a different number of turns of conductor 22. For example, there are ten turns of conductor 22 around hole 20a, whereas there is but one turn of conductor 22 around hole 20j.

Conductor 22 is embedded within member 12 which may be constructed from any suitable nonconducting material such as plastic or the like, and member 12 serves the purpose of maintaining the respective coils of conductor 22 in predetermined spaced relationship, for example, disposed around the respective holes 20.

Member 14 is constructed identically with member 12 with the exception that the terminal posts 26a and 28a extend outwardly from member 14 in the opposite direction from posts 26 and 28 of member 12 so that members 12 and 14 may freely rotate relative to one another about axle 16.

It should be pointed out at this juncture that the winding of conductor 22 around the holes 20 has been accomplished in the manner shown in FIG. 2 for the specific purpose of presenting a different number of turns of conductor 22 around each hole 20 without the windings becoming so bulky that members 12 and 14 would be extremely large and require unnecessary wide spacing between the respective holes 20. An alternate way in which members 12 and 14 could be wound in the achievement of the objectives of this invention is illustrated schematically in FIG. 8 wherein a member 30, having a plurality of holes 32, is illustrated. A conductor 34 is shown in dashed lines as extending around the respective holes 32a, 32b and 32c, with one turn of conductor 34 comprising the coil around hole 32a, two turns around hole 32b, and three turns around hole 32c. It will be evident that with such construction to be continued in the windings of conductor 34 for member 30, it would be necessary to have ten turns of conductor 34 around hole 32j. This would require extremely wide spacing between hole 32j and the next preceding hole in the series. These deficiencies are avoided in the windings of apparatus 10.

Holes 20a–20j are of sufficient diameter to receive therethrough an inductive-type current measuring device which may be a clamp-on type ammeter broadly designated 36 and having jaws 38 disposed to extend through the holes 20. Ammeter 36 is of conventional design, is well known to those skilled in the art, and forms no part of this invention per se so will not be further described.

Manifestly, any number of turns of conductor 22 may extend around the respective holes 20, it being sufficient that each coil of conductor 22 be provided with a hole 20. It is contemplated that each coil will comprise any desired number of turns of conductor 22 as is deemed appropriate for the purpose for which apparatus 10 is to be used, which purpose will become more clear hereinafter. For clarity of illustration, however, each of the coils for the respective holes 20j–20a have been shown with one more turn passing therearound than extended around the next preceding hole.

Referring now to FIG. 3, a member 40 similar to member 12, is shown. It is to be pointed out, however, that member 40 differs from member 12 in that member 40 is not provided with an aperture 18 and is not utilized in conjunction with a second member. Member 40 is provided with a pair of terminals 42 and 44, the terminals being electrically coupled to opposed ends of a continuous conductor 46.

Member 40 is provided with a plurality of holes 48a–48j, and the conductor 46 extends around the respective holes 48 in much the same manner as heretofore previously described with respect to conductor 22 and members 12 and 14. It is to be noted however, that with respect to member 40, conductor 46 makes one complete turn around all of the holes 48, another complete turn around the holes 48a–48i, and then two turns around all of the holes 48a–48h, followed by three turns around the holes 48a–48g. This provides one turn of conductor 46 in the coil around the hole 48j, two turns of conductor 46 in the coil around hole 48i, four turns of the conductor in the coil around hole 48h, and seven turns of conductor 46 in the coil around the hole 48g. The number of turns of the conductor in each coil may be arbitrarily chosen as will hereinafter be more clear. It will be evident to those skilled in the art that, if desired, members 12 and 14 could be wound in the manner illustrated with member 40 and, similarly, member 40 could be wound in any other suitable manner, it being preferred that each coil comprise a different number of turns from any other coil.

The induction-type current measuring device 36 is illustrated in FIG. 3, having its jaws 38 passing through hole 48c of member 40 with a cable 50 having a current-conducting wire 52 passing through the jaws 38 of device 36.

The apparatus 10 is illustrated schematically in FIG. 4 wherein is shown one coil of member 12 electrically coupled with a source 54 of alternating current electrical energy by means of a line 56 coupled with terminal 26 and one side of source 54, there being a second line 58 connected to terminal 28 and the other side of source 54 through a switch 60. Similarly, a coil of member 14 is electrically coupled with a second source 62 of electrical energy by means of a line 64 extending from terminal 26a of member 14, and a line 66 extending from terminal 28a to the other side of source 62 through a switch 68.

A yet further modified embodiment of the apparatus of this invention is illustrated in FIG. 5 wherein the apparatus is broadly designated 110 and comprises a pair of members 112 and 114 which are similar to members 12 and 14. It will be noted, however, that member 112 differs from member 12 in that a resistance 70 is coupled with terminal 128 of member 112 by a line 72, and a resistance 74 is coupled to the terminal 128 of a member 114 by a line 76. The other end of resistance 70 is coupled to one side of a source 78 of electrical energy by a line 80 and a switch 82, while the other side of source 78 is coupled with terminal 126 of member 112 by a line 84.

In like manner, the opposite end of resistance 74 is coupled to one side of a source 86 of electrical energy by a line 88 and a switch 90, while the terminal 126a of member 114 is coupled with the other side of source 86 by a line 92.

Referring now to FIG. 6, another modified form of the apparatus of this invention is broadly designated 210 and comprises a pair of members 212 and 214. Member 212 may be similar to member 112 and is connected in a circuit with a source 278 substantially identical to the circuit coupling of the conductor of member 112 to source 78. It will be noted, however, that member 212 differs from member 112 in that a voltage measuring device 94 is coupled to the end of resistance 270 proximal terminal 228 of member 212 by a line 96. Device 94 is similarly coupled to the other end of resistance 270 by a line 98. A second voltage measuring device 100 is shown connected to the one end of resistance 270 by a line 102 and to terminal 226 of member 212 by a line 104.

As will become clear, it is not necessary to take simultaneous voltage readings across the terminals 226 and 228 and across resistance 270. Therefore, it would be possible to omit either device 94 or 100, provision being made to releasably connect a voltage measuring device to the circuit so that voltage readings might be selectively taken where indicated in the diagram.

Member 214 may be identical to member 14 and, for simplicity, will not be further described, it being sufficient to point out that member 214 is adapted to be coupled with a source 262 of electrical energy.

The modified form of the apparatus illustrated in FIG. 3 is shown schematically in FIG. 7 wherein member 40 is shown coupled with a source 106 of electrical energy by lines 116 and 118 coupled respectively to terminals 42 and 44. A switch 120 may be provided in the circuit if desired. Wire 52 is shown proximal one of the coils of conductor 46 of member 40 and extends into connection with a source 122 of electrical energy in a circuit which may include a switch 124.

The apparatus of this invention may be conveniently utilized in the computation of the phase angle between the power components emanating from a pair of sources. Apparatus 10 is particularly suited for use in the determination of the angle between a pair of currents. It is well known that the phase angle between two different currents may be computed if the magnitude of the separate currents are known, as well as the magnitude of the resultant current from the application of both currents simultaneously.

Assuming that $I_1$ represents one of the currents, $I_2$ represents the other of said currents, and $I_R$ represents the resultant current from the measurement of both currents simultaneously, then the formula for computing the phase angle $\theta$ between such currents is:

$$\cos \theta = \frac{I_R^2 - I_1^2 - I_2^2}{2 I_1 I_2}$$

It has heretofore been difficult, however, to compute the angle $\theta$ because the wide range of values likely to be encountered by the measuring devices made it difficult to determine the individual currents, as well as the combined or resultant current. For example, the current values often are such that the individual current readings are very near one end or the other of the measuring ammeter, or are widely different in magnitude. When the currents are combined, the resultant current is then extremely likely to either exceed or be less than the current which can be measured by that particular ammeter, or be of a magnitude which cannot be distinguished from one of the individual currents, resulting in either the necessity for additional ammeters, or other means to step up or reduce the currents.

The first step in utilizing device 10 is to couple the terminals 26 and 28 of member 12 to the source of current which may be source 54 schematically illustrated in FIG. 4. Then, ammeter 36 is passed through any of the holes 20 of member 12, noting the meter reading of ammeter 36. It will be readily apparent to anyone skilled in the art that the reading of ammeter 36 will be a function of the number of turns of conductor 22, around the particular hole into which the jaws 38 of ammeter 36 are disposed when the reading is taken.

It should be pointed out at this juncture that it is desirable and important to select a particular hole 20 for obtaining the current reading, which reading will be in the mid-range of the scale of ammeter 36. It is necessary in the computation of the phase angle to obtain a reading of the resultant current when the two currents to be compared are simultaneously applied to apparatus 10. If the current reading at the selected hole is near the upper end of the scale of ammeter 36 when only the one current is applied, then necessarily the resultant current is quite likely to be in excess of the values measurable by ammeter 36 when both currents are applied simultaneously. This is especially true when the phase angle between the two currents is very small or even 0°.

Further, most ammeters inherently are more accurate in measuring currents near the mid-range of their respective scales than in measuring currents either relatively high or relatively low on the scales. The inaccuracies which would be obtained in such relatively high or relatively low readings would be reflected in the computation of the phase angle through use of apparatus 10.

A meter reading in the mid-range of ammeter 36 may be obtained by moving the jaws 38 thereof from hole to hole until a particular hole is located which has the proper number of turns of conductor 22. If desired, indicia may be provided on member 12 to designate the number of turns of the respective holes and thus aid in speed of obtaining the correct hole. The reading of the current which is obtained at the selected hole is recorded as $I_1$.

The next step to be followed in utilizing apparatus 10 is to disconnect source 54 from terminals 26 and 28 as by opening switch 60, and to connect a source 62 of a second current to terminals 26a and 28a of member 14 through lines 64 and 66. Switch 68 is then closed to complete the circuit through the conductor 22 of member 14, and ammeter 36 is moved to a hole to give a desired meter reading of the current emanating from source 62. The meter reading is preferably near the mid-range of ammeter 36. This reading is recorded as $I_2$. The members 12 and 14 are then rotated on axle 16 relative to one another to align the holes of the respective members which were utilized in obtaining readings $I_1$ and $I_2$. Both currents from sources 54 and 62, respectively, are then applied to the respective conductors of the members 12 and 14 as by closing switches 60 and 68, and the reading thus obtained through the aligned holes previously utilized is recorded as $I_R$. This resultant current will normally be within the range of the meter of the ammeter because the readings of $I_1$ and $I_2$ were chosen at a value approximating mid-range of the ammeter. The resultant reading may range from zero to approximately full scale on the ammeter, the actual value being determined by the phase angle between $I_1$ and $I_2$. If $I_1$ is in phase with $I_2$, the reading will approximate full scale. If $I_1$ is 180° out of phase with $I_2$, the resultant will approximate a zero reading. It is but necessary to substitute the values of $I_1$, $I_2$ and $I_R$ thus obtained into the formula set forth above to derive the angle $\theta$. If, however, the resulting current $I_R$ is of a magnitude which would not be within the range of ammeter 36 when the reading is taken through the initially aligned holes, ammeter 36 may be moved to another hole when both currents are applied to obtain a reading $I_R$ which is within the range of the ammeter. If this is necessary, new values for $I_1$ and $I_2$ should then be derived by applying separately, the current first from source 54 and then from source 62 with the readings being individually taken through the newly aligned holes.

By way of illustration of the utilization of apparatus 10, assume that the actual current flowing from source 54 through the circuit is 2.25 amperes. Assuming further that the range of instrument 36 is 0 to 15 amperes, then it would be desirable to take the reading of $I_1$ through hole 20h of member 12 wherein three turns of conductor 22 comprises the coil extending around hole 20h. This would result in the multiplication of the current from source 54 by a factor of 3, and the reading obtained through hole 20h would be 6.75 amperes. This would be recorded as $I_1$.

Now assuming the actual current from source 62 is 4.25 amperes, a multiplication by the factor of 2, would result in a reading of 8.5 amperes, which as was $I_1$, is near the mid-range of instrument 36. The multiplication of current from source 62 by the factor of 2, is obtainable through hole 20i of member 14 which has two turns of conductor 22 passing therearound. The reading 8.5 amperes is recorded as $I_2$.

The currents from sources 54 and 62 are next applied simultaneously to apparatus 10 with hole 20i of member 14 aligned with hole 20h of member 12. Ammeter 36 is moved to the aligned holes 20i and 20h wherein a reading is obtained and read at approximately 13.28 amperes. This reading of the simultaneous currents is recorded as $I_R$.

Substituting the values obtained in the steps set forth in the formula set out above, it is determined that cos $\theta$ equals .5. Thus, $\theta$, the phase angle between the two currents, is 60°.

Figure 8:
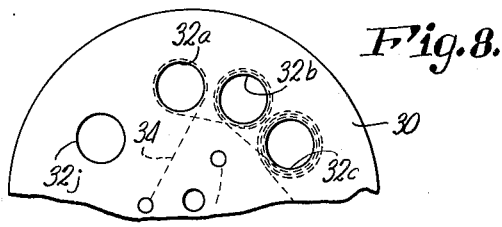
FIG. 8 is a fragmentary, plan view on a reduced scale of another form of the apparatus of this invention, the windings of three of the coils appearing in dotted lines.

It will be readily understood that member 30 shown in FIG. 8 could, in conjunction with an identical member 30 (not shown), be utilized in the same way as heretofore described with respect to members 12 and 14 in obtaining meter readings suitable for computing the phase angle.

Referring now to FIGS. 3 and 7, the modified form of the apparatus of this invention, member 40, is shown for utilization in determining the phase angle of a pair of currents emanating from sources 106 and 122 respectively. In the embodiment illustrated however, it is contemplated that the wire 52 is carrying current of a magnitude which may be readily read by instrument 36 without the necessity for magnification by means of the apparatus of this invention. Further, it is assumed that the current emanating from source 106 is not of a magnitude in the order of the current in wire 52 and would require magnification.

The current carried in lines 116 and 118 may be stepped up to the order desired by passage through conductor 46 in member 40 with the ammeter reading being obtained through any of the available holes 48 in member 40. The reading of ammeter 36 may be obtained in the manner heretofore set forth with respect to member 12 and will not be described in detail. Suffice it to say that ammeter 36 is moved to any of the available holes 48 until the desired mid-range reading is obtained. Such reading is recorded as $I_1$. Secondly, with switch 120 open, switch 124 is closed to send the current through wire 52, which current is read from ammeter 36 and recorded as $I_2$. Then, with both switches 120 and 124 in the closed positions, the resulting current $I_R$ is read and recorded, allowing computation of the phase angle between the two currents exactly as heretofore outlined.

When it is desired to compute the phase angle between a pair of voltages (as opposed to a pair of currents), it is necessary to utilize device 110 illustrated schematically in FIG. 5. A resistance 70 and 74 is connected in series with respective conductors of members 112 and 114 and the respective sources 78 and 86 so that the voltages of the sources 78 and 86 produce a flow of current through the respective circuits. A close approximation of the phase angle θ between the voltages of sources 78 and 86 may be obtained by following exactly the steps heretofore enumerated with respect to determining the phase angle between the pair of currents. For most determinations, the approximation obtained by such steps will be sufficient, and it will not be necessary to determine with more exactness the angle between the applied voltages.

It will be obvious to those skilled in the art, however, that because of the inductance of the coils of the conductors of the respective members 112 and 114, the currents read by use of ammeter 36, will lag the applied voltages. However, if the current through the conductor of member 112 is lagging its applied voltage, and the current through the conductor of member 114 is also lagging its applied voltage, the errors tend to be compensating and it is extremely rare that further corrective computation would be indicated or desirable.

However, referring now to FIG. 6, if the phase angle θ is to be determined between a voltage from source 278 and a current from source 262, there is no compensating error, and it may sometimes be necessary to compute a correction. Thus, member 212 of apparatus 10 is provided with means for measuring the voltage across resistance 270 and across the coil of the conductor of member 212. The steps in obtaining the approximate phase angle are identical to those heretofore described with respect to apparatus 10 and will not be further elaborated. However, when the voltage from source 278 is applied to the conductor of member 212, the readings of measuring device 94 and of measuring device 100, may be utilized to compute a corrective angle α to be added to the approximate computation of the phase angle obtained by following the steps outlined above. If $V_R$ is assigned to the reading in volts of device 94, and $V_L$ in volts is assigned to the reading of device 100, those skilled in the art will be aware that angle α may be computed by the formula:

$$\tan \alpha = \frac{V_L}{V_R}$$

Manifestly, it will be necessary to know whether corrective angle α should be added or subtracted from the computation of the phase angle between the voltages in order to obtain the corrected phase angle θ. Suffice it to say, that if the current is leading the voltage, α should be subtracted from the approximate phase angle, and if the current is lagging the voltage, α should be added to the approximate phase angle. Whether or not the current is lagging the voltage will normally be known and will depend upon the type of circuit carrying the current. Specifically, if the circuit is a motor circuit, the current will normally be lagging, and if it is a condenser circuit, the current will lead the voltage.

While specific embodiments have been shown and described above in which the principles of the invention have been incorporated, it is to be understood that the invention is not to be limited to the exact details shown and described above, but that, in fact, widely different embodiments may be employed in the practice of the broad aspects of the invention.

Having thus described the invention, what is claimed as new and desired to be secured by Letters Patent is:

1. In apparatus for use in determining the phase relationship between a power component of a first electrical source and a power component of a second electrical source,
   (a) a first continuous electrical conductor formed into a plurality of coils, each coil being of a different number of turns of said conductor;
   (b) first terminal means electrically coupled to each end of said conductor and adapted to be coupled with said first electrical source;
   (c) a second continuous electrical conductor formed into a plurality of coils, each coil being of a different number of turns of said conductor; and
   (d) second terminal means electrically coupled to each end of said second conductor and adapted to be coupled to said second electrical source, said first and second conductors being shiftable to dispose any coil of said first conductor adjacent any coil of said second conductor.

2. Apparatus as set forth in claim 1, wherein is provided a first member for carrying the first conductor, and a second member for carrying the second conductor.

3. Apparatus as set forth in claim 1, wherein said members are provided with a plurality of holes passing through the outer margins thereof, there being a hole for each coil with the respective coils passing around corresponding holes.

4. Apparatus as set forth in claim 3, wherein said members are relatively rotatable.

5. In apparatus for use in determining the phase relationship between the voltages of first and second electrical sources,
   (a) a first electrical conductor comprising a plurality of spaced coils, each coil being of a different number of turns of said first conductor;
   (b) a first resistance;
   (c) first circuit means electrically coupling said first resistance and the first conductor in series across the first source;
   (d) a second electrical conductor comprising a plurality of spaced coils, each coil being of a different number of turns of said second conductor;
   (e) a second resistance; and
   (f) second circuit means electrically coupling the second resistance and the second conductor in series across the second source, said conductors being shiftable to dispose any coil of the first conductor adjacent any coil of the second conductor whereby the current flowing through said adjacent coils may be measured simultaneously.

6. In apparatus for use in determining the phase relationship between the voltage of a first electrical source and the current of a second electrical source,
   (a) a first electrical conductor comprising a plurality of spaced coils, each coil being of a different number of turns of said first conductor;
   (b) a resistance;
   (c) a first terminal electrically coupled to one end of the first conductor;
   (d) a second terminal electrically coupled to the opposite end of the first conductor;
   (e) first circuit means connected to said first and second terminals and adapted to be coupled to said first source for connecting the first conductor across said first source, the resistance being coupled in series in said first circuit between the first terminal and the first source with one end of the resistance being coupled to said first terminal;
   (f) means for measuring the voltage from said one end of the resistance to the other end thereof and from the one end of the resistance to said second terminal;
   (g) a second electrical conductor comprising a plurality of spaced coils, each coil being of a different number of turns of said second conductor; and
   (h) means for electrically coupling the second conductor to said second source, the coils of said conductors being relatively shiftable whereby any coil of the first conductor may be disposed adjacent any coil of the second conductor to facilitate simultaneous measurement of the currents flowing through the adjacent coils.

7. In apparatus for use in determining the phase relationship between a power component of a first electrical source and a power component of a second electrical source,
   (a) a first disc-like member of electrically nonconductive material having a generally annular row of holes extending therethrough adjacent the circumferential margin thereof;
   (b) a second disc-like member of electrically nonconductive material having a generally annular row of holes extending therethrough adjacent the circumferential margin thereof;
   (c) a first continuous electrical conductor embedded in the first member and formed into a series of coils, each coil being of a different number of turns of said conductor, there being a coil for each hole of said first member with each coil passing around its corresponding hole, the turns of each succeeding coil of the row passing around all of the preceding coils of said row;
   (d) a second continuous electrical conductor embedded in the second member and formed into a plurality of coils, each coil being of a different number of turns of said conductor, there being a coil for each hole of said first member with each coil passing around its corresponding hole, the turns of each succeeding coil of the row passing around all of the preceding coils of said row;
   (e) first terminal means electrically coupled to each end of said first conductor and adapted to be coupled with said first electrical source;
   (f) second terminal means electrically coupled to each end of said second conductor and adapted to be coupled to said second electrical source; and
   (g) means mounting the members for relative rotation about their respective axes whereby any hole of one of the members may be selectively aligned with any hole of the other of said members to permit measurement through the aligned holes of the current flow through the coils disposed around said aligned holes.

8. In apparatus for use in determining the phase relationship between a power component of a first electrical source and a power component of a second electrical source,
   (a) a first disc-like member of electrically nonconductive material having a generally annular row of holes extending therethrough adjacent the circumferential margin thereof;
   (b) a first continuous electrical conductor embedded in the first member and formed into a row of coils, each coil being of a different number of turns of said conductor, there being a coil for each hole of said first member with each coil being disposed only around its corresponding hole;
   (c) a second disc-like member of electrically nonconductive material having a generally annular row of holes extending therethrough adjacent the circumferential margin thereof;
   (d) a second continuous electrical conductor embedded in the second member and formed into a row of coils, each coil being of a different number turns of said conductor, there being a coil for each hole of said first member with each coil being disposed only around its corresponding hole;
   (e) first terminal means electrically coupled to each end of said first conductor and adapted to be coupled with said first electrical source;
   (f) second terminal means electrically coupled to each end of said second conductor and adapted to be coupled to said second electrical source; and
   (g) means mounting the members for relative rotation about their respective axes whereby any hole of one of the members may be selectively aligned with any hole of the other of said members to permit measurement through the aligned holes of the current flow through the coils disposed around said aligned holes.

References Cited by the Examiner

UNITED STATES PATENTS

| | | | |
|---|---|---|---|
| 255,749 | 3/1882 | Woolson | 317—191 |
| 341,981 | 5/1886 | Woolson | 317—191 |
| 2,014,524 | 9/1935 | Franz | 336—200 |
| 2,475,190 | 7/1949 | Levy | 324—90 |

WALTER L. CARLSON, *Primary Examiner.*

A. RICHMOND, *Assistant Examiner.*